(12) United States Patent
Ostergren et al.

(10) Patent No.: US 8,029,367 B2
(45) Date of Patent: Oct. 4, 2011

(54) AUTOMATIC DELIVERY OF GAME CONTENT TO A GAME CONSOLE

(75) Inventors: Brian Hunter Ostergren, Redmond, WA (US); Trisha Eileen Stouffer, Woodinville, WA (US); Jonathan Todd David, Seattle, WA (US); Gregory Joseph Canessa, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 600 days.

(21) Appl. No.: 11/653,734

(22) Filed: Jan. 15, 2007

(65) Prior Publication Data

US 2008/0171600 A1    Jul. 17, 2008

(51) Int. Cl.
A63F 9/24    (2006.01)

(52) U.S. Cl. ................. 463/42; 463/1; 463/40

(58) Field of Classification Search ......... 463/1, 29, 463/40, 41, 42, 43
See application file for complete search history.

(56) References Cited

U.S. PATENT DOCUMENTS

| | | | |
|---|---|---|---|
| 5,043,887 A | 8/1991 | Richardson | 364/410 |
| 5,634,849 A | 6/1997 | Abecassis | 463/30 |
| 5,654,746 A | 8/1997 | McMullan, Jr. et al. | 348/6 |
| 5,944,608 A * | 8/1999 | Reed et al. | 463/40 |
| 7,131,909 B2 | 11/2006 | Rowe | 463/42 |
| 2002/0180782 A1 | 12/2002 | Natsuno | 345/743 |
| 2003/0181242 A1 * | 9/2003 | Lee et al. | 463/42 |
| 2004/0097288 A1 | 5/2004 | Sloate et al. | 463/42 |
| 2004/0128250 A1 * | 7/2004 | Fox et al. | 705/52 |
| 2004/0199646 A1 * | 10/2004 | Susai et al. | 709/227 |
| 2005/0054431 A1 | 3/2005 | Walker et al. | 463/25 |
| 2005/0261062 A1 * | 11/2005 | Lewin et al. | 463/42 |
| 2006/0031829 A1 | 2/2006 | Harris et al. | 717/173 |
| 2006/0136964 A1 * | 6/2006 | Diez et al. | 725/37 |
| 2006/0160622 A1 * | 7/2006 | Lee et al. | 463/42 |
| 2006/0199646 A1 | 9/2006 | Kogo | 463/43 |
| 2007/0060361 A1 * | 3/2007 | Nguyen et al. | 463/42 |
| 2007/0088826 A1 * | 4/2007 | Raphel et al. | 709/225 |
| 2007/0130158 A1 * | 6/2007 | LaBiche et al. | 707/10 |
| 2007/0220552 A1 * | 9/2007 | Juster et al. | 725/46 |
| 2008/0298467 A1 * | 12/2008 | Sallinen et al. | 375/240.25 |

FOREIGN PATENT DOCUMENTS

GB    2331814 A    *    6/1999

OTHER PUBLICATIONS

Shaikh et al., "On Demand Platform for Online Games," IBM Systems Journal, vol. 45, No. 1.
"Xbox 360 Console," http://www.hmv.co.uk/hmvweb/displayProductDetails.do?ctx=12;- 1;-1;-1&sku=404389.
Reuters, "Sonly Gives PlayStation 3 Online Service Details," Oct. 20, 2006, http://www.eweek.com/article2/0,1759,20346880,00.asp?kc=EWRSS03119TX1K0000594.

* cited by examiner

*Primary Examiner* — Dmitry Suhol
*Assistant Examiner* — Jay Trent Liddle
(74) *Attorney, Agent, or Firm* — Alleman Hall McCoy Russell & Tuttle LLP (57) ABSTRACT

Automatic downloading of game content to a game console is provided. A user enables automatic downloading, and thereafter, game content available from a game server is periodically checked to determine if any content matches criteria specified for downloading. If a match is found, and the user has not previously downloaded the content, or a previous version of the content, then the game content is added to a download queue. The content specified in the download queue is transferred to the game console.

20 Claims, 9 Drawing Sheets

AUTOMATIC DELIVERY OF GAME CONTENT TO A GAME CONSOLE

BACKGROUND

Historically, gaming consoles have been dedicated to devices that connect to a monitor and that allow a user to play a game stored on a game cartridge or disc that is inserted into the gaming console. Thus, the games available to a user were provided on gaming modules or optical discs that the user had to purchase and bring home. When a user wanted to play a game, the user had to insert the module or disc into the gaming console. The game would typically automatically start when it was inserted into the console. When the user desired to play a different game, the existing game had to be removed from the gaming console and the new game had to be inserted into the gaming console.

Traditionally, gaming consoles had also been isolated from other devices other than a television monitor. As such, they were not viewed as devices that could be networked.

This changed with the introduction of the MICROSOFT® XBOX® gaming console which provided network connectivity for the gaming console. To take advantage of this network connectivity, MICROSOFT® introduced a gaming disc known as MICROSOFT® Arcade, which was able to connect to a server through the Internet when the gaming console was connected to the Internet. The server site that the Arcade disc could reach was dedicated to XBOX® consoles that were executing the Arcade application stored on the Arcade disc. As such, other devices could not reach this server site, and further, XBOX® consoles that did not have the Arcade gaming disc running could not reach the server site.

MICROSOFT® eventually released a newer version of their gaming console called the XBOX 360®, which also provided support for network connectivity. MICROSOFT® directly integrated Arcade functionality into the XBOX 360® gaming console. Thus, users gained the ability to reach the server site and access Arcade functionality without having to install a dedicated Arcade gaming disc. Currently, the XBOX 360® gaming console is the latest available version of a gaming console in the XBOX® product category.

From the server site, the Arcade components integrated into the XBOX 360® gaming console are able to enumerate full version games that are stored on the server and that can be downloaded to the user's hard disc drive on the XBOX 360® console. The XBOX 360® supports the display of games that are available on the server, with games that have not previously been downloaded being displayed in a different manner than games that have been downloaded. By selecting one of the games that has not been downloaded, the user is able to download the game onto their hard disc drive for a fee.

MICROSOFT® XBOX LIVE® Arcade was the first service to introduce a "try before you buy" sales model in the console gaming industry. In accordance with this model, a user can download and play a limited portion of a game for little or no fee, and then subsequently convert to a full version for a fee when and if desired. This sales model was introduced in association with the XBOX® console and was also included within the Arcade platform associated with the XBOX 360® console. These experiences have shown that it is desirable, at least based on a goal of increasing sales revenue, to employ effective means for driving higher trial downloads and conversion rates to the full version of each game. For users who wished to try, or buy, the very latest games it has traditionally been necessary for such users to periodically check the list of new games in the XBOX® available on the server.

This requires repeated input and/or interaction from the user, and may limit the degree to which users seek and obtain new content from the server.

The discussion above is merely provided for general background information and is not intended for use as an aid in determining the scope of the claimed subject matter.

SUMMARY

Automatic downloading of game content to a game console is provided. A user enables automatic downloading and then game content that is available from a game server is periodically checked to determine if any content matches criteria specified for downloading. If a match is found, and the user has not previously downloaded the content, or a previous version of the content, then the game content is added to a download queue. The content specified in the download queue is transferred to the game console.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
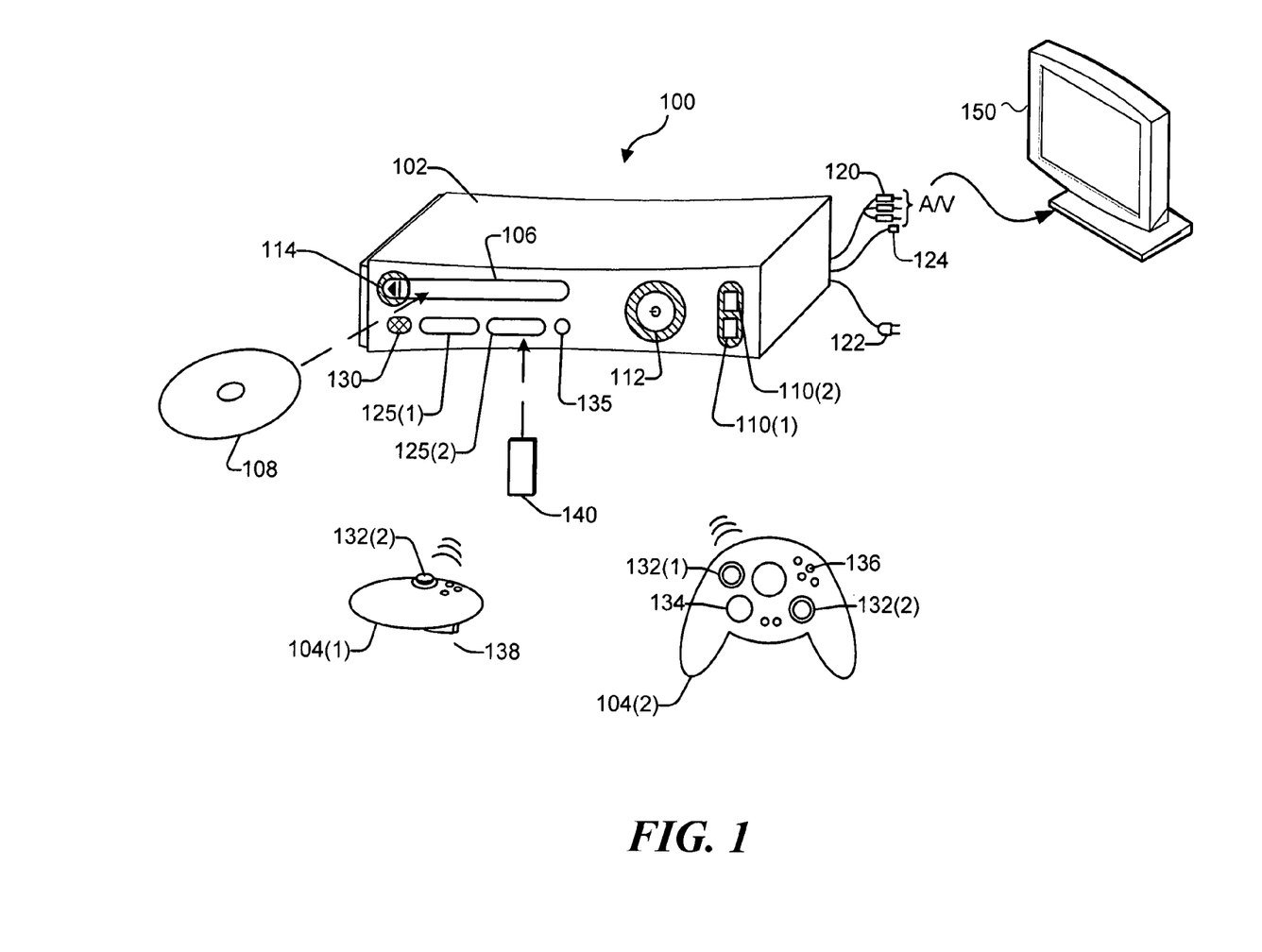
FIG. 1 is a diagram of external components of a gaming console.

FIG. 1 illustrates an example of a gaming and media system 100 that may be part of an environment in which embodiments can be implemented. System 100 is but one example of a suitable computing system and is not intended to suggest any limitation as to the scope of use or functionality of the claimed subject matter. Neither should system 100 be interpreted as having any dependency or requirement relating to any one or combination of illustrated components.

Gaming and media system 100 includes a game and media console (hereinafter simply "console" or "game console") 102. Console 102 is configured to accommodate one or more wireless controllers, as represented by controllers 104(1) and 104(2). Further, console 102 is equipped with an internal hard disk drive (not shown), and a portable media drive 106 that supports various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140. A command button 135 on console 102 enables and disables wireless peripheral support.

As depicted in FIG. 1, console 102 also includes an optical port 130 for communicating wirelessly with one or more devices and two Universal Serial Bus (USB) ports 110(1) and 110(2) to support a wired connection for additional controllers, or other peripherals. In some implementations, the number-and arrangement of additional ports may be modified. A power button 112 and an eject button 114 are also positioned on the front face of game console 102. Power button 112 is selected to apply power to the game console, and can also provide access to other features and controls. An eject button 114 alternately opens and closes the tray of portable media drive 106 to enable insertion and extraction of a storage disc 108.

Console 102 connects to a television or other display via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet.

Each controller 104 is coupled to console 102 via a wired or wireless interface. In the illustrated implementation, the controllers are USB-compatible and are coupled to console 102 via a wireless interface or USB port 110. Console 102 may be equipped with any of a wide variety of user interaction mechanisms. In the example illustrated in FIG. 1, each controller 104 is equipped with two thumbsticks 132(1) and 132(2), a D-pad 134, buttons 136, and two triggers 138. These controllers are merely representative, and other known gaming controllers may be substituted for, or added to, those shown in FIG. 1.

Gaming and media system 100 is generally configured for interacting with games and other digital content stored on a memory medium (internal and/or portable), shopping for and purchasing products such as electronic media including game and game component downloads, and reproducing pre-recorded music and videos, from both electronic and hard media sources. With the different storage offerings, titles can be played from the hard disk drive, from optical disk media (e.g., 108), from an online source, or from a memory unit 140 connected to one of the receptacles 125. A sample, certainly not by limitation, of some of the types of media that gaming and media system 100 is capable of playing include 1) game titles played from CD and DVD discs, from the hard disk drive, or from an online source; 2) Digital music played from a CD in portable media drive 106, from a file on the hard disk drive, or from online streaming sources; and 3) Digital audio/video played from a DVD disc in portable media drive 106, from a file on the hard disk drive, or from online streaming sources.

Figure 2:
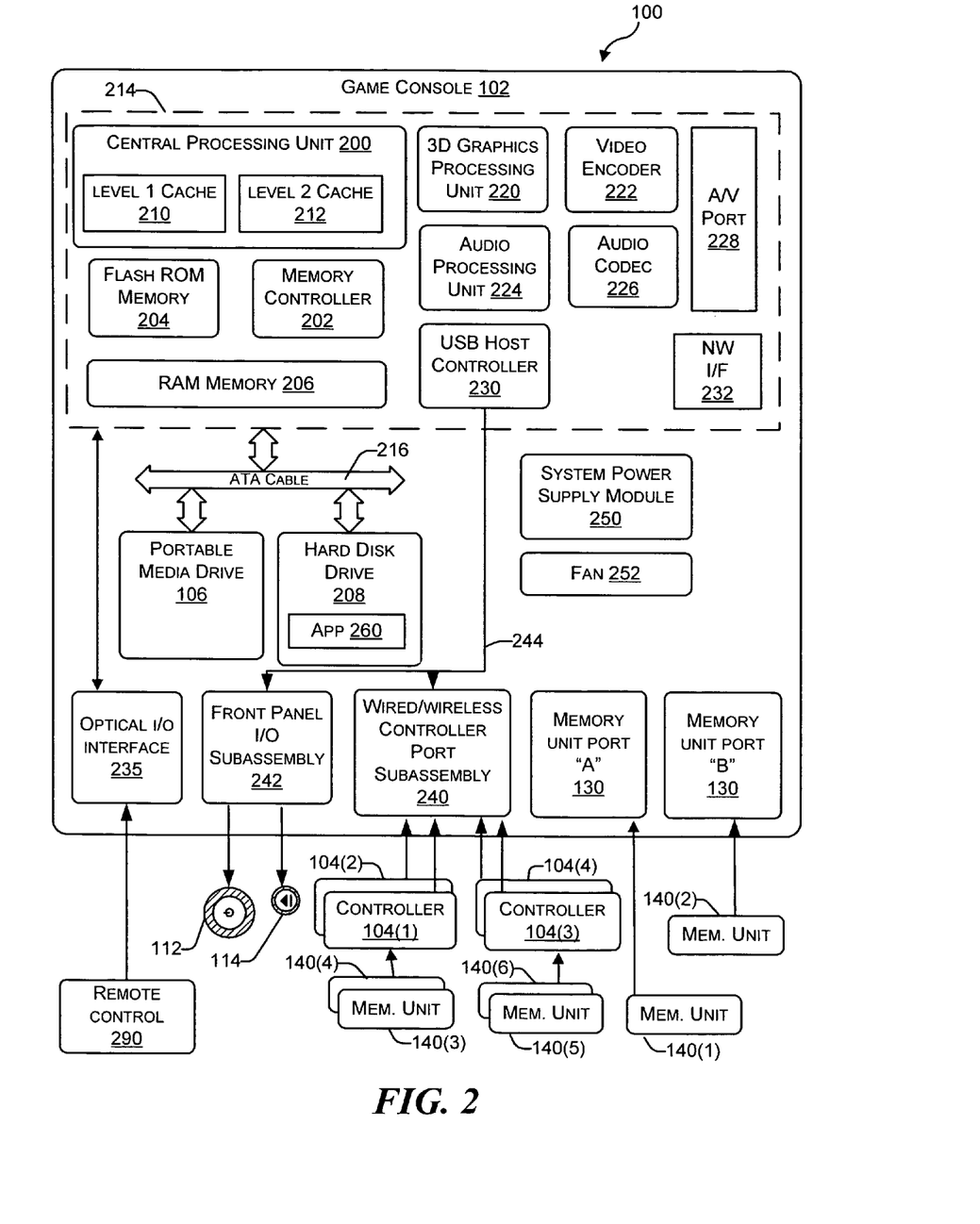
FIG. 2 is a block diagram of internal components of a gaming console.

FIG. 2 is a functional block diagram of gaming and media system 100 and shows functional components in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210, and a level 2 cache 212 to temporarily store data and hence reduce the number of memory access cycles made to the hard drive, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a Peripheral Component Interconnect (PCI) bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104. Network interface 232 provides access to a network (e.g., Internet, home network, etc.) and may be any of a wide variety of various wire or wireless interface components including an Ethernet card or interface module, a modem, a Bluetooth module, a cable modem, and the like.

In the implementation depicted in FIG. 2, console 102 includes a controller support subassembly 240, for supporting four controllers 104(1)-104(4). The controller support subassembly 240 includes any hardware and software components needed to support wired and/or wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

Memory units (MUs) 140(1) and 140(2) are illustrated as being connectable to MU ports "A" 130(1) and "B" 130(2), respectively. Each MU 140 offers additional storage on which games, game parameters, and other data may be stored. In some implementations, the other data can include one or more of a digital game component, an executable gaming application, an instruction set for expanding a gaming application, and a media file. When inserted into console 102, MU 140 can be accessed by memory controller 202.

A system power supply module 250 provides power to the components of gaming system 100. A fan 252 cools the circuitry within console 102.

An application 260 comprising machine instructions is stored on hard disk drive 208. When console 102 is powered on, various portions of application 260 are loaded into RAM 206, and/or caches 210 and 212, for execution on CPU 200. In general, application 260 can include one or more program modules for performing various display functions, such as controlling dialog screens for presentation on a display (e.g., high definition monitor 150), controlling transactions based on user inputs and controlling data transmission and reception between the console 100 and externally connected devices.

Gaming system 100 may be operated as a standalone system by simply connecting the system to high definition monitor 150 (FIG. 1), a television, a video projector, or other display device. In this standalone mode, gaming system 100 enables one or more players to play games, or enjoy digital media, e.g., by watching movies, or listening to music. However, with the integration of broadband connectivity made available through network interface 232, gaming system 100 may further be operated as a participating component in a larger network gaming community or system.

Figure 3:
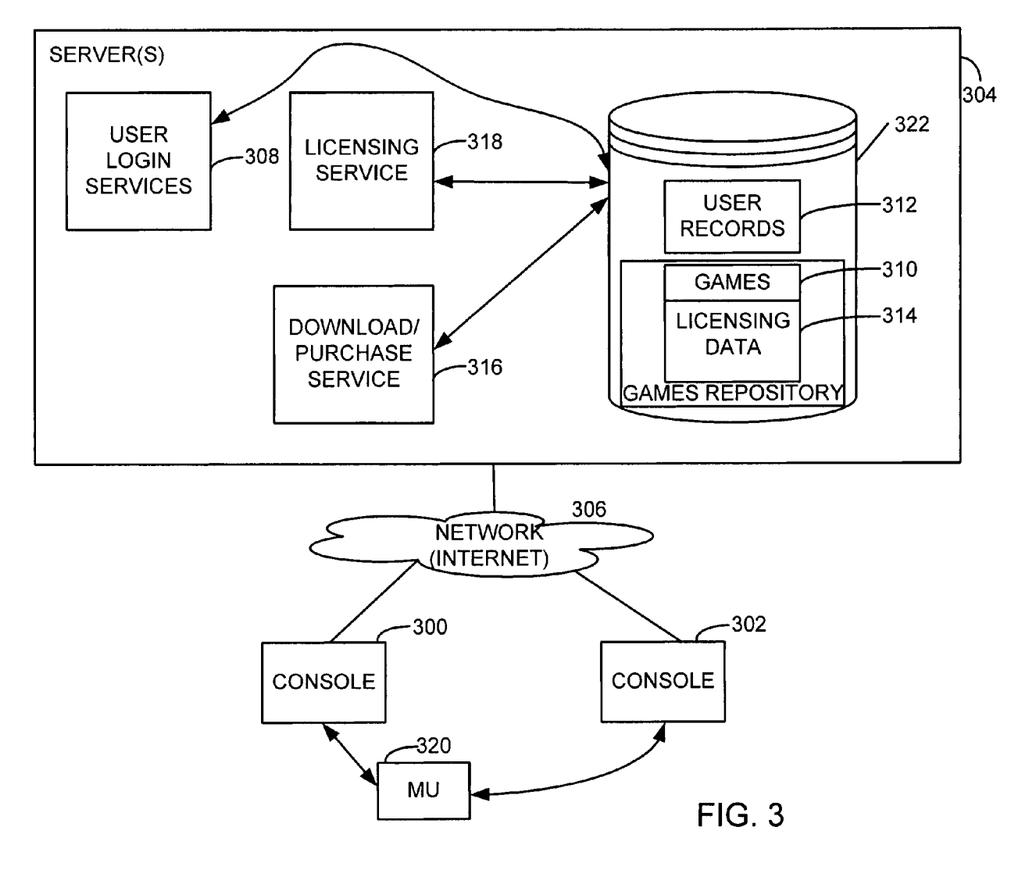
FIG. 3 is a block diagram of consoles networked with one or more servers.

FIG. 3 provides a block diagram of multiple consoles 300 and 302 networked with one or more servers 304 through a network connection 306. In one embodiment, network connection 306 comprises the Internet. Servers 304 provide a collection of services that applications running on console 300 may invoke and utilize. For example, consoles 300 and 302 may invoke user login services 308 which are used to authenticate users on consoles 300 and 302 by obtaining a Gamer Tag and a password from each user. User login services 308 access user records 312 in a database 322, which may be located on the same server as user login services 308 or may be distributed on a different server or a collection of different servers. User records 312 include the Gamer Tag and password that allow a user to be authenticated by user login services 308. User records 312 also include additional information about the user including games that have been downloaded by the user, and licensing packages that have been issued for those downloaded games, including the permissions associated with each licensing package. In addition, user records 312 can include financial information about the user including a credit card number associated with the user account and an account balance stored for the user in terms of points instead of dollars to allow for micro-payments. For example, $20 may purchase 1600 points. These points may be purchased through the credit card or redeeming gift cards through consoles 300 and 302. The points may be redeemed to purchase one or more games 310 stored on database 322 through a download purchase service 316. In addition to full games 310, points may be redeemed to purchase content for games previously downloaded to a console 300, 302. This content can include additional levels, maps, characters, equipment and other items that may be used to expand play on a game on consoles 300, 302.

When a game or content is purchased, a licensing service 318 is used to generate licensing packets that provide permissions allowing the game or content to be played on the console. Under one embodiment, licensing service 318 generates a user license package and a machine license package with each download. The user license package allows a user logged into servers 304 to use the content or game regardless of the console that the user is playing on. The machine license allows any user on the console the content or game is downloaded to, to use the game or content. In several embodiments, licensing service 318 includes cryptography elements that allow it to encrypt the licensing packages to prevent access to the licensing package except by the console that the licensing package is downloaded to, which uses a key to decrypt the licensing package and except permissions for the user and the console based on the licensing packages. Typically, the licensing package forms part of the downloaded content or game so that when the content or game is copied onto a memory unit such as memory unit 320 the licensing package accompanies the gaming content. Portable memory unit 320 may be moved between console 300 and 302 so that content stored on memory unit 320 from console 300 may be read by console 302.

Figure 4:
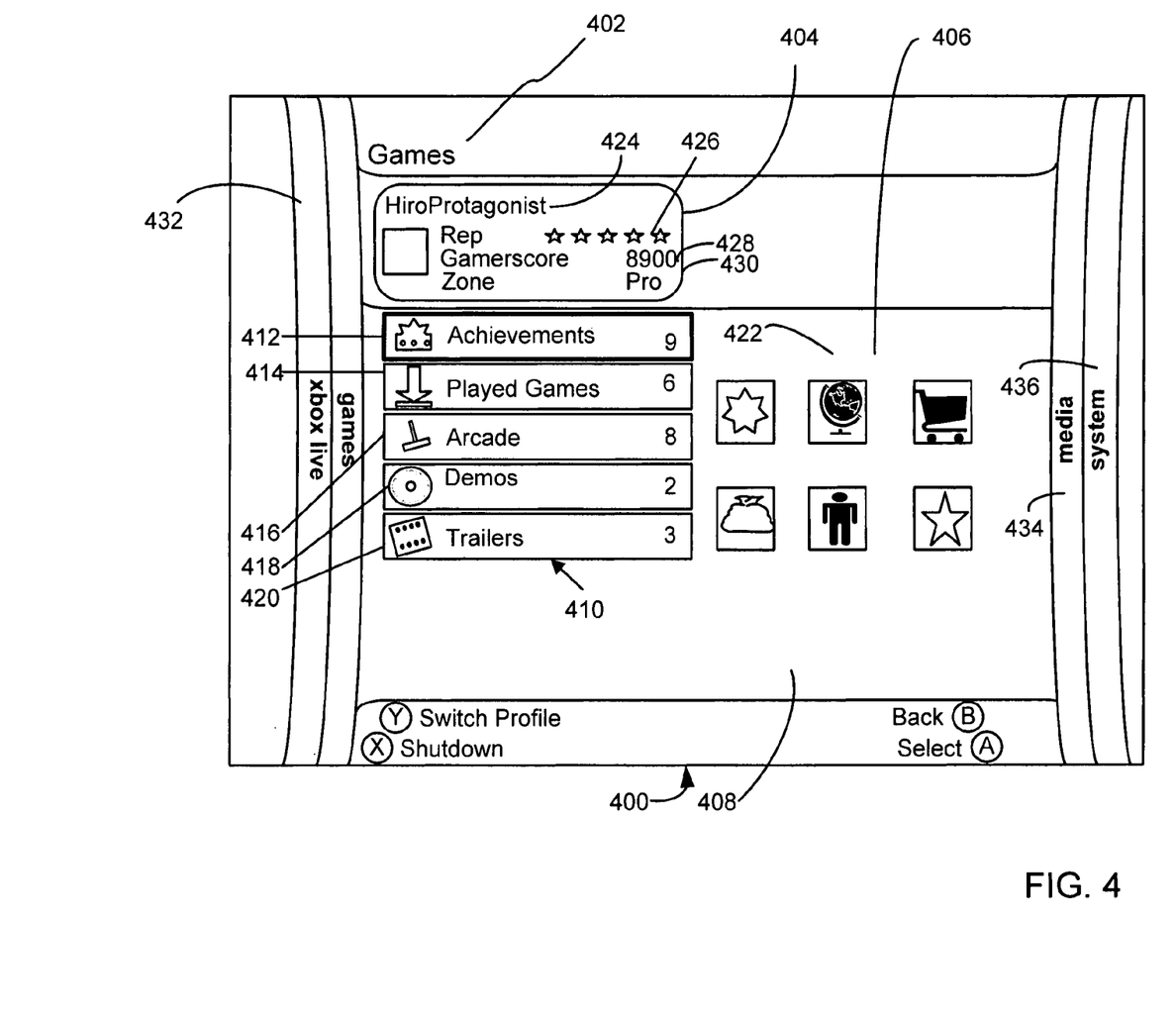
FIG. 4 is a diagrammatic view of an exemplary games blade user interface.

FIG. 4 provides an example of a games blade user interface that is illustratively presented to a user of a console as described. In FIG. 4, games blade 400 is shown to contain a title 402, a gamer card 404, a banner area 406, a banner area 408 and a menu listing 410 consisting of achievements 412, played games 414, arcade games 416, demos 418 and trailers 420. Elements in listing 410 may be highlighted using an associated game controller. When an element is highlighted, icons and text relative to the highlighted element appear in area 422. For example, in FIG. 4, the achievements element 412 is highlighted resulting in icons being displayed in area 422 that represent different games and the achievements that the user has acquired for those games.

Gamer card 404 includes information about the current user. This information includes the current user's Gamer tag 424, their reputation 426, their Gamerscore 428 and their preferred zone of play 430.

The user interface of FIG. 4 also provides tabs 432, 434 and 436, which can be used to bring up an XBOX LIVE® blade, a media blade and a system blade, respectively. The XBOX LIVE® blade 432 is an interface dedicated primarily to enabling access to network-based system resources. The media blade 434 allows the user to interact with different forms of media that may be attached to the console or stored on the hard disc drive of the console. System tab 436 allows the user to bring up a system blade that provides options for the console.

Figure 5:
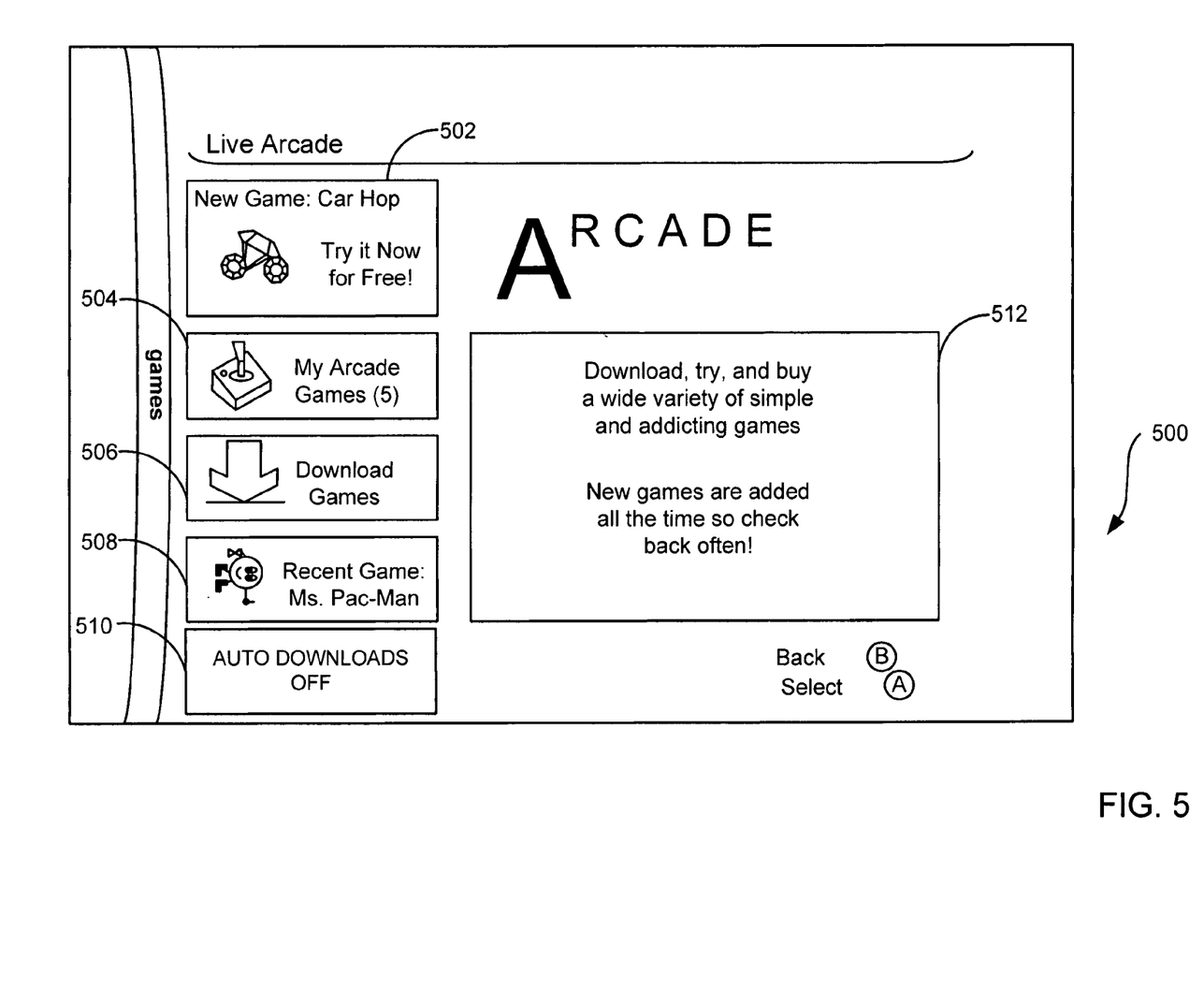
FIG. 5 is a diagrammatic view of an exemplary arcade user interface in accordance with an embodiment.

From games blade 400, the user can open an arcade page by selecting arcade element 416 in list 410. An example of the arcade page is shown on FIG. 5. In FIG. 5, the arcade page 500 is shown on the games blade and includes a banner area 502, a "my arcade games" menu item 504, a download games menu item 506, a recent game menu item 508, and an automatic downloads menu item 510. The menu items 504, 506, 508 and 510 may be highlighted using the game controller. When a menu item is highlighted, a description of the item is shown in description area 512. Banner 502 can contain advertisements for games that can be downloaded, including free demos of games as is indicated in FIG. 5 where the game "Car Hop" is advertised for download. Area 512 may also contain advertisements in certain states.

Menu item 504, when selected, brings up a "My Arcade Games" page, which lists the trial version games and full version games that the user has downloaded to their machine. When menu item 506 is selected, a page of arcade games that can be downloaded to the user's machine is presented to the user. Thus, the user is provided with access to multiple separate menu items, one that allows the user to see all of the games that have already been downloaded to their machine, and the other providing a list of games that the user can download to their machine. It should be noted that, in one embodiment, the arcade page of FIG. 5 is not stored on an optical disc, but instead is stored in the flash memory of the gaming console. As a result, the user does not have to enter a disc in order to see the games stored on their machine or to view games that they could download to their machine.

As has been alluded to, a user can illustratively try a game on a limited basis. Subsequently, if desired, the user can purchase access to the game with the limitation or limitations removed. The trial is likely to be either free or available for a price less than the price of the version without the limitations. Traditionally, users have been required to periodically check for new game content (either trial or otherwise) that they have not downloaded. However, as indicated in FIG. 5, embodiments described herein generally allow a user to selectively engage automatic downloading of content to the game console. FIG. 5 depicts menu item 510 showing the automatic downloads feature currently set to the "off" setting. As a user highlights menu item 510, additional information regarding automatic downloads is presented to the user in banner area 512. Upon selecting menu item 510, the user is presented with a new blade interface relative to the automatic downloads feature.

Figure 6:
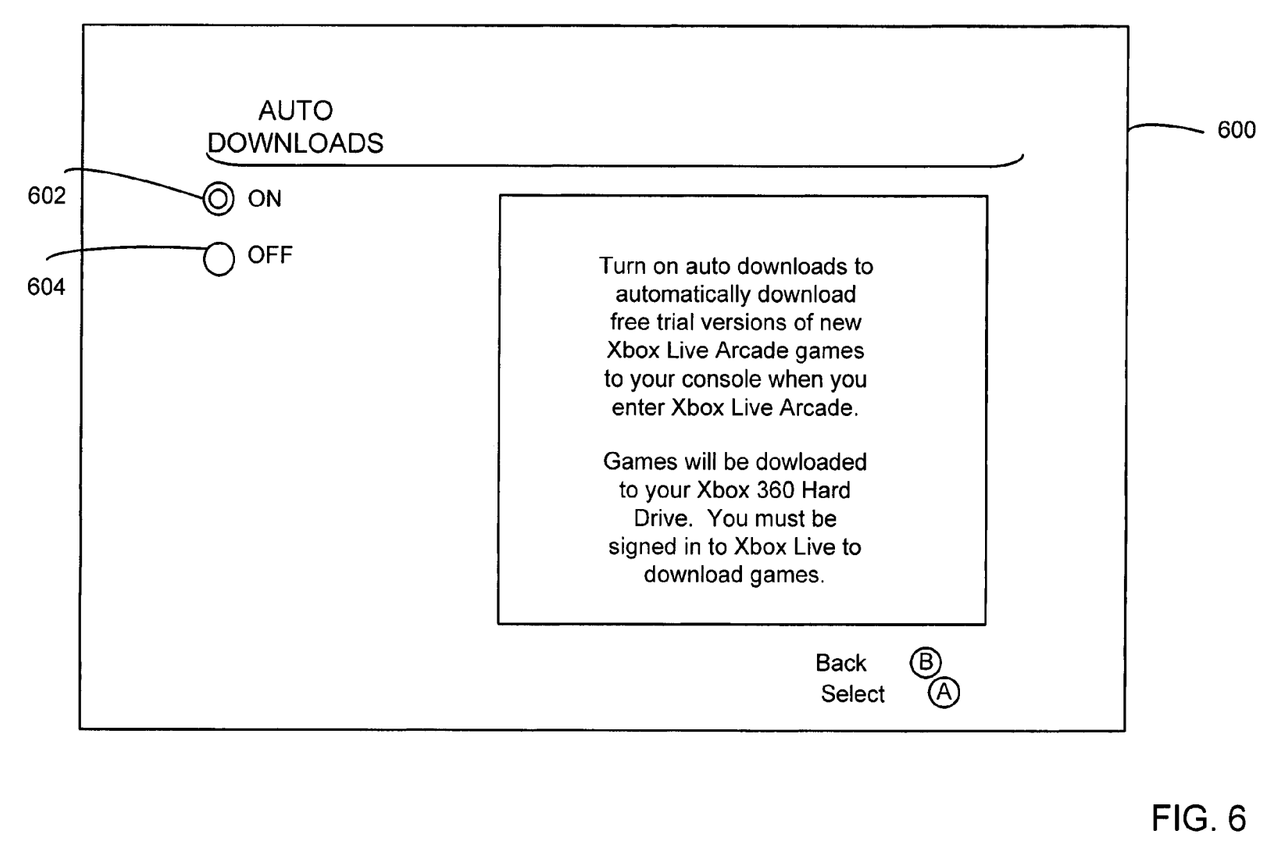
FIG. 6 is a diagrammatic view of an automatic downloads user interface in accordance with one embodiment.

FIG. 6 provides an example of an automatic downloads blade user interface that is illustratively presented to a user of a console as described. Blade 600 is relatively simple in that it only provides user interface elements 602, 604 corresponding, respectively, to automatic downloads settings of "on" and "off." In such embodiment, setting automatic downloads to on will cause console 102 to periodically, or in response to a message from server(s) 304, check to see if any new games are available on server(s) 304 that have not been previously downloaded by the user. If such games exist, they are added to a download queue. Console 102 downloads content specified in the download queue automatically. Such automatic downloading preferably occurs as a background operation for console 102. Thus, a user can still play other games, or otherwise utilize console 102, even as new content is being automatically downloaded.

Figure 7:
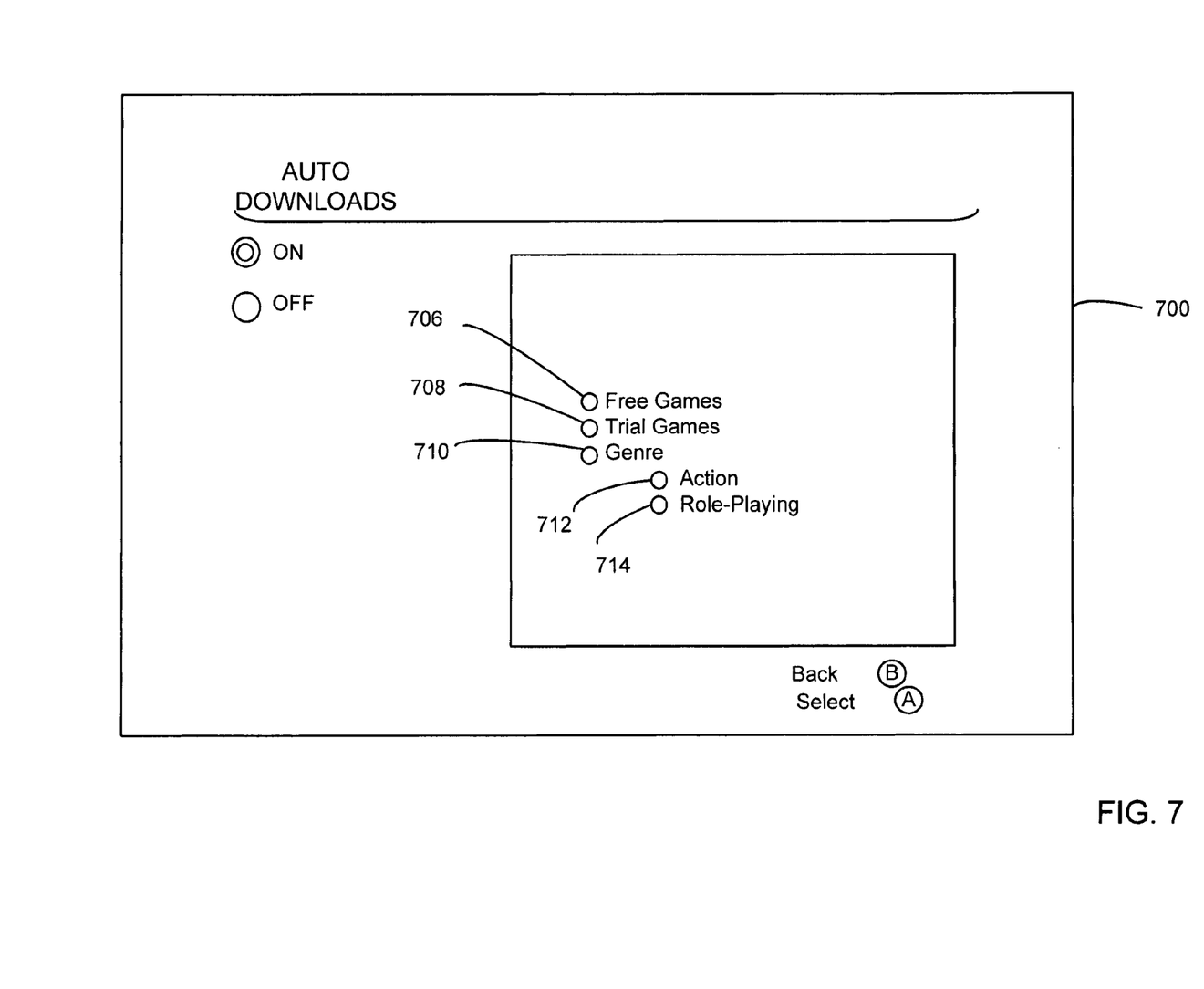
FIG. 7 is a diagrammatic view of an automatic downloads user interface in accordance with another embodiment.

FIG. 7 provides an example of an alternate automatic downloads blade user interface that is illustratively presented to a user of a console as described. Blade interface 700 not only allows a user to change the setting of automatic downloads between on (702) and off (704) states, but also provides the user with the ability to customize download behavior. For example, the user can select specify particular aspects of each game for which he/she would like to obtain an automatic download. For example, a user can select user interface elements 706 or 708 corresponding, respectively, to parameters "Free" and "Trial." Additionally, certain genres of games, such as Action, Role-playing, et cetera can be selected by selection of user interface elements 710, 712, and 714. In essence, any suitable game parameters can be presented to a user, who may then select which criteria should be satisfied before game content is automatically downloaded to the user's console(s).

Figure 8:
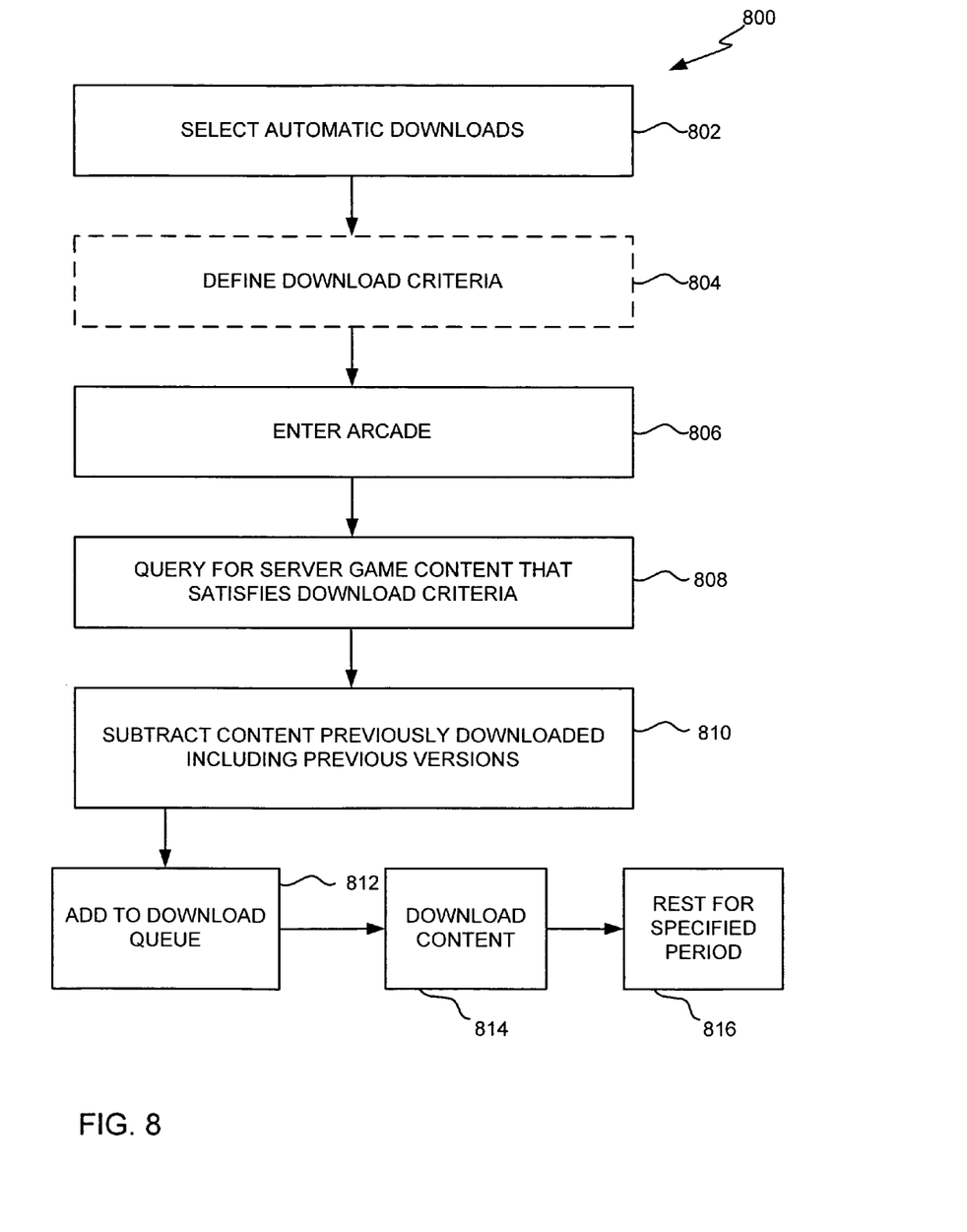
FIG. 8 is a flow diagram of a method for automatically transferring game content to a game console in accordance with an embodiment.

FIG. 8 is a flow diagram of a method of automatically downloading game content to a game console in accordance with an embodiment. Method 800 begins at block 802 where a user enables automatic downloading of content. This enablement can be in the form of selecting a check box marked "on" in the Automatic Downloads blade user interface, or it can be done in any suitable manner. Optionally, block 804 can allow a user to specify download criteria for the automatic downloading feature. Such criteria can include any data or parameters relative to game content including, but not limited to, whether, and/or to what extent the game content is new, whether the game content is free, whether the game content is trial content, the size of the game content to download, the genre of the game content, the rating of the game content, or any other suitable parameters. At block 806, the user accesses the arcade server. Included in such access is preferably a successful authentication via the user's provision of a GamerTag and password. At blocks 808, 810 queries are performed to determine what content is available on the server that satisfies the download criteria (e.g. is new) and to determine the user's download history, respectively. These queries can be generated from the user's console, by the server itself upon recognizing the user's entry into arcade at block 806, or any combination of the two. At block 812, any content that satisfies the user's download criteria and has not been previously downloaded is added to the console's download queue. Preferably the download queue executes in the background thereby allowing the user to otherwise use the console during the download. Preferably, if game content is available, but the user has previously downloaded a different version of the content, then the new content will not be downloaded. For example, if ExampleGame 1.1 has been previously downloaded and ExampleGame 1.9 is subsequently made available, it will not be automatically downloaded. However, this is simply a preference, and can also be a parameter over which the user can exercise control in block 802. At block 814, content listed in the download queue is downloaded from the arcade server to the user's console. Once the download is complete, the new content will automatically show up, or otherwise be displayed, in the user's game collection. Preferably, such content will show up as "New" content, or bear some other suitable label.

Finally, at block 816, the automatic download process rests for a specified period of time, before returning to block 808. The specified period of time can be another variable or parameter that can be set by the user at block 802. Thus, a user may be able to select an interval within which the process loops. However, other method for setting the specified period can also be used. For example, when new game content is released, hundreds of thousands of users' consoles may recognize the new content and start downloading the new content. The result of such an automatic inrush of download requests, and accompanied downloads may slow server response. To address this situation, each console may delay its request for downloadable content until server response time meets a certain threshold, or the server otherwise indicates that it is ready to accommodate download requests.

Figure 9:
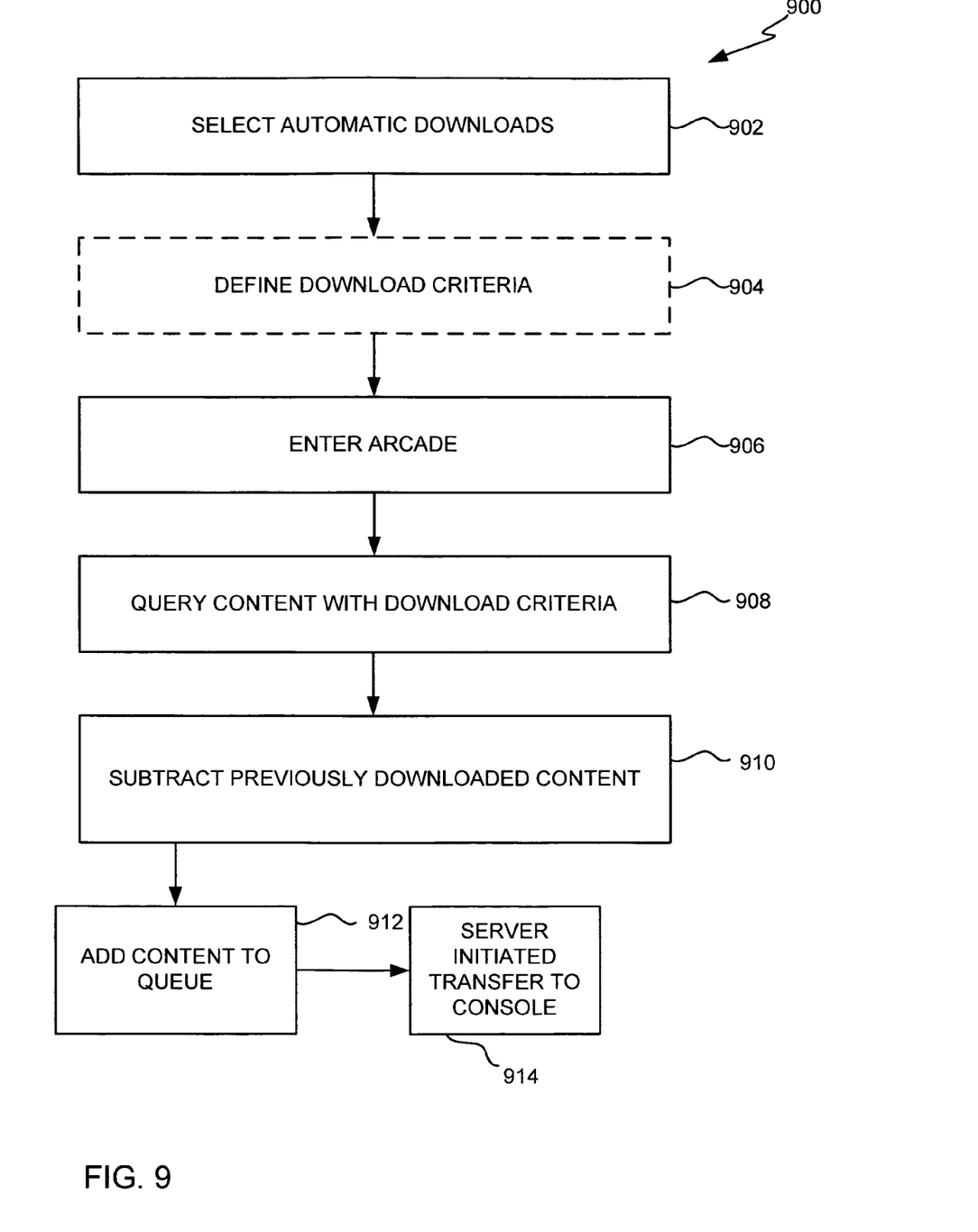
FIG. 9 is a flow diagram of a method for automatically transferring game content to a game console in accordance with another embodiment.

FIG. 9 is a flow diagram of a method of automatically downloading game content to a game console in accordance with another embodiment. The embodiment illustrated with respect to FIG. 9 differs from that of FIG. 8 primarily in the degree to which the embodiment relies upon server(s) 304. For simplicity, the embodiment illustrated with respect to FIG. 9 can be considered more server-centric, while that of FIG. 8 can be considered more console-centric. However, each embodiment relies, at least to some degree, on both the console and the server.

Method 900 begins at block 902 where a user enables automatic downloading of content to the user's game console. While the enablement set forth in block 902 may take the same form as that set forth above with respect to block 802, enablement can also be selected by a user's access to server(s) 304 via an alternate connection, such as using a browser to access HTML content at server(s) 304. Thus, block 902 can take the form of a user directing a browser to a URL of server 304, being presented with a login screen or dialog, and providing the user's Gamertag and password. Once authenticated, the user would have access to their profile settings, including the setting of whether automatic downloads are selected and/or specified. At optional 904, the user can enter information to define criteria which must be satisfied by server game content before such content is eligible for automatic downloading to the user's console. The content set forth can be any of that set forth above with respect to block 804. At block 906 the user enters arcade. This block 906 requires that the user's console makes an authenticated access to the arcade server. During such access, a session token or other suitable data can be stored on the console, such that server(s) 304 can later determine whether the console has been authenticated in server(s) 304 which to initiate interactions with the console. However, a single authenticated access by the console to the server may allow secure server-to-console transfers for a selectable amount of time, such as a day. At block 908, server (s) 304 performs a query using the download criteria from block 904, or suitable default criteria, such as "new" content, to identify game content stored thereon that satisfies the criteria. The query can be run periodically, or in response to an event on the server(s), such as new content being added. From the query results, content that has been previously been downloaded by the user is excluded, as indicated at block 910. Server 304 can examine its download history records for the user in order to determine previously downloaded content. The remaining content is added to the user's download queue for all of the user's authorized consoles, as indicated at block 912. Next, at block 914, server(s) 304 initiate contact with the user's console(s) and transfer the queued content to the user's console(s). Method 900, by virtue of its ability to focus upon server events, can obviate automatic periodic checking, and the associated bandwidth of thousands of consoles. However, when new content is made available, there may still be thousands of consoles that should have the content transferred thereto. However, since the transfers are initiated by the server, provisioning software or modules can easily control the rate at which transfers are effected such that overall server performance is not unduly affected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for automatically downloading game content to a game console, the method comprising:
    obtaining an indication relative to a user's enablement of automatic downloading of game content relative to the console;
    performing a query of game content on a game server to generate a download queue of game content that satisfies at least one criterion;
    excluding, from the download queue, game content that has been previously downloaded to the game console;
    excluding, from the download queue, any updated version of game content stored on the game console; and
    automatically downloading contents of the download queue to the game console, automatically downloading including:
        determining a response time of the game server;
        when the response time satisfies a threshold condition, downloading contents of the download queue to the console; and
        when the response time does not satisfy the threshold condition, delaying downloading contents of the download queue to the console.

2. The method of claim 1, wherein the at least one criterion includes whether the game content is newly available for downloading to the game console from the game server.

3. The method of claim 1, and further comprising receiving a user's specification of criteria for game content that is eligible for automatic downloading.

4. The method of claim 3, wherein the criteria includes whether the game content is newly available for downloading to the game console from the game server.

5. The method of claim 3, wherein the criteria includes whether the game content is trial content.

6. The method of claim 3, wherein the criteria includes at least one genre of game content.

7. The method of claim 3, wherein the criteria includes a storage capacity required for the game content.

8. The method of claim 3, wherein the criteria includes a rating of the game content.

9. The method of claim 1, wherein the steps of performing a query of game content, excluding game content that has been previously downloaded to the game console, and automatically downloading contents of the download queue to the game console occur periodically while the user's console is coupled to the server.

10. The method of claim 1, wherein obtaining an indication relative to a user's enablement of automatic downloading relative to the console is accomplished by providing the user with a user interface generated by the console, that allows the user to select a user interface element associated with an enabled state.

11. The method of claim 1, wherein obtaining an indication relative to a user's enablement of automatic downloading relative to the console is accomplished by a user's authenticated access to the server using a browser, wherein the user's interaction with the server is via a web page generated by the server.

12. The method of claim 1, wherein automatically downloading the game content of the download queue includes the server initiating a transfer of the game content onto the console.

13. The method of claim 1, wherein the method is executed in response to a server event.

14. The method of claim 13, wherein the server event is the addition of game content, the game content being newly available for downloading to the game console from the game server.

15. A computer-implemented method for automatically transferring game content to a game console, the method comprising;
    selectively querying game content on a game server to generate a download queue of game content;
    excluding, from the download queue, any newer version of game content stored on the game console; and
    automatically transferring game content listed in the download queue to the game console, automatically transferring including:

determining a response time of the game server;

when the response time satisfies a threshold condition, transferring game content listed in the listing to the console; and when the response time does not satisfy the threshold condition, delaying transferring game content listed in the listing to the console.

16. The method of claim 15, wherein selectively querying game content is performed in accordance with enablement of automatic downloading of game content to the game console.

17. The method of claim 15, wherein the game content is transferred from the game server to the game console.

18. The method of claim 15, wherein excluding, from the download queue, any newer version of game content includes identifying a version number of a game content item stored on the game console and excluding any version of the game content item having a higher version number than the version number of the game content item stored on the game console from the download queue.

19. A computer-implemented method for automatically downloading game content to a game console, the method comprising:

obtaining an indication of a user's enablement of automatic downloading of game content to the game console;

performing a query of game content on a game server to generate a download queue of game content that satisfies at least one criterion;

excluding, from the download queue, game content that has been previously downloaded to the game console;

excluding, from the download queue, any newer version of game content stored on the game console; and downloading game content in the download queue from the game server to the game console.

20. The method of claim 19, wherein excluding, from the download queue, any newer version of game content includes identifying a version number of a game content item stored on the game console and excluding any version of the game content item having a higher version number than the version number of the game content item stored on the game console from the download queue.

* * * * *